United States Patent [19]

Ferguson

[11] Patent Number: 4,545,256
[45] Date of Patent: Oct. 8, 1985

[54] INTEGRAL SOLID FRONT GAUGE CASE FOR A PRESSURE GAUGE

[75] Inventor: Walter J. Ferguson, Middlebury, Conn.

[73] Assignee: Dresser Industries, Inc., Dallas, Tex.

[21] Appl. No.: 705,038

[22] Filed: Feb. 25, 1985

Related U.S. Application Data

[63] Continuation of Ser. No. 485,920, Apr. 18, 1983, abandoned.

[51] Int. Cl.⁴ .......................... G01L 7/04; G01P 1/02
[52] U.S. Cl. ........................................ 73/738; 73/431
[58] Field of Search .......... 73/738, 741, 756, 731–735, 73/739, 740, 742, 743, 431

[56] References Cited

U.S. PATENT DOCUMENTS

| 980,403 | 1/1911 | Blanchard et al. | 73/740 |
| 1,761,751 | 6/1930 | Schlaich | 73/732 |
| 2,215,013 | 9/1940 | Mickelberg | 73/738 |
| 2,752,787 | 7/1953 | Jankura | 73/738 |
| 3,201,992 | 8/1965 | Hoff, Jr. | 73/738 |
| 3,938,393 | 2/1976 | Mogensen et al. | 73/738 |
| 4,051,730 | 10/1977 | Andrews et al. | 73/738 |
| 4,154,116 | 5/1979 | Stahn et al. | 73/738 |
| 4,175,444 | 11/1979 | Harland | 73/738 |
| 4,333,348 | 6/1982 | Berninger | 73/708 |

FOREIGN PATENT DOCUMENTS 2249266 8/1974 Fed. Rep. of Germany .

Primary Examiner—Donald O. Woodiel
Attorney, Agent, or Firm—Daniel Rubin

[57] ABSTRACT

A case of sheet metal construction for a pressure gauge having a solid front case wall extending integral from the annular sidewall of the case.

3 Claims, 4 Drawing Figures

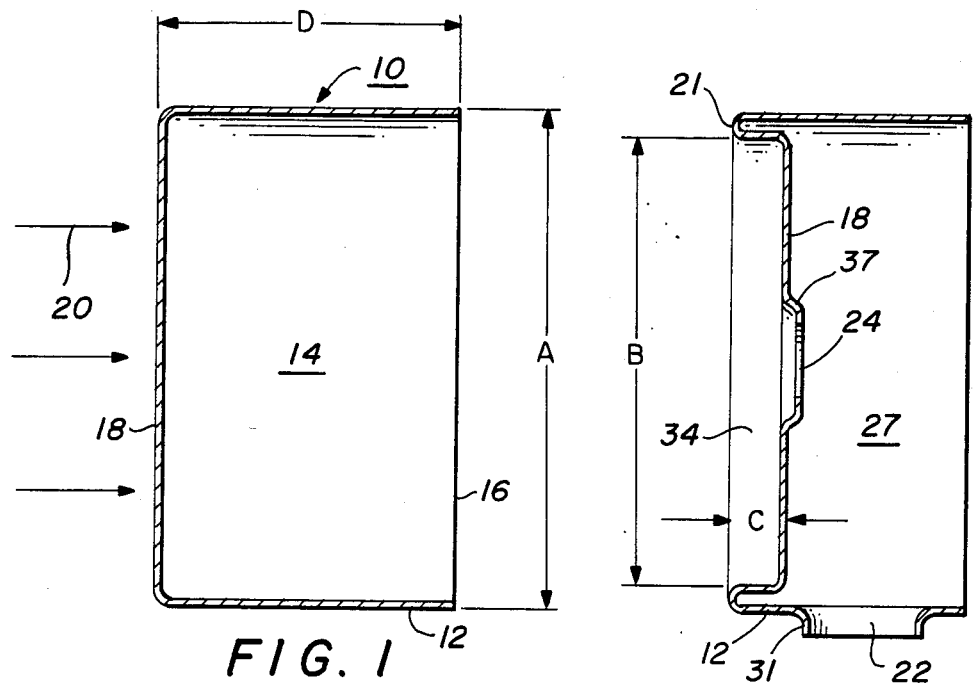
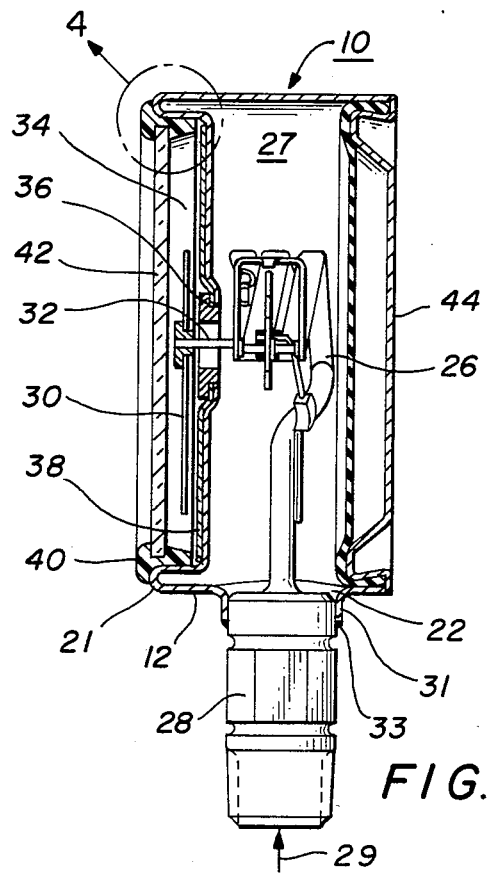

INTEGRAL SOLID FRONT GAUGE CASE FOR A PRESSURE GAUGE

This application is a continuation of application Ser. No. 485,920, filed Apr. 18, 1983, now abandoned.

BACKGROUND OF THE INVENTION

1. The field of art to which the invention pertains includes the art of measuring and testing as directed to fluid pressure gauges.

2. Gauge instruments and particularly pressure gauges or the like have been widely used and are commercially available from a variety of manufacturing sources. Being that such pressure gauges enjoy very extensive commercial and industrial use, they are supplied by a plurality of manufacturers and are regarded as high production items. Because they are sold in very price conscious competition, each manufacturer instinctively strives to reduce product costs by improvements, however marginal, which reduce labor and/or materials that can contribute to cost savings in the end product.

A common form of case construction for a pressure gauge comprises the "solid front" type in which an intermediate wall separates the case into front and rear compartments. In the usual arrangement, the front compartment contains the indicating mechanism, whereas the pressurized element is contained in the rear compartment such that should the element incur failure from overpressure or whatever, relief is afforded rearward rather than forward of the case. Construction of the solid front gauge case is largely governed by the American National Standard Institute (ANSI) Standard B40.1-1974, Section 3.1.1.2.

Typical prior art solid front gauge case constructions as shown by the patent literature include those in which the solid front wall is separately fabricated and then joined to the peripheral case wall of another construction as, for example, disclosed in U.S. Pat. Nos. 4,154,166 and 4,175,444. There are also those in which the solid front wall is cast or molded integral with the peripheral wall as disclosed, for example, in U.S. Pat. Nos. 2,215,013 and 2,752,787. Whereas it has long been recognized that the aforementioned solid front gauge constructions have been comparatively costly to manufacture, it has not heretofore been known how to significantly reduce such costs.

SUMMARY OF THE INVENTION

This invention relates to pressure gauges and more specifically to a novel solid front case construction therefor less costly to fabricate than similar type case constructions of the prior art. This is achieved in accordance with the invention by means of a case formed of a cutout from a sheet metal stamping. After forming the cutout, it is deep drawn to a shape constituting an annular enclosure defining an internal cavity therein open at one end and closed by an end wall on the other end. By means of a pre-shaped die subsequently applied laterally against the exterior face of the end wall in a direction inward of the cavity, the wall is deformed to a predetermined reentrant recess inward of the enclosure to constitute the "solid front" of the case. On subsequently punching the necessary apertures for receipt of the operating mechanism and supplying a suitable rear enclosure, the case is completed and ready for use. By this relatively simple fabrication procedure a solid front gauge case is formed with all the attributes of more costly prior art constructions but at significantly less cost.

It is therefore an object of the invention to effect a novel solid front gauge case for a pressure gauge less costly to fabricate than heretofore;

It is a further object of the invention to provide a novel method for producing the gauge case of the previous object;

It is a still further object of the invention to manufacture a pressure gauge with the case of the previous objects.

BRIEF DESCRIPTION OF THE DRAWINGS

FIGS. 1 and 2 are sequential sectional views of a solid front gauge case formed in accordance with the invention;

FIG. 3 is a sectional elevation through a pressure gauge utilizing the gauge case hereof; and FIG. 4 is an alternative construction for the encircled portion of FIG. 3.

Referring now to FIGS. 1 and 2 of the drawings, the gauge case hereof designated 10 is initially formed into the cup shaped arrangement of FIG. 1 by stamping and deep drawing a cutout from sheet metal to form an annular periphery 12 of dimension A and width D. Internally, there is defined a cavity 14 open at one end 16 and closed at the other end by an integral wall formation 18. With or without annealing, a force 20 from a die of predetermined shape is subsequently applied laterally against the outside face of wall 18 until a reentrant recess of dimension C and diameter B is formed as illustrated in FIG. 2, while concomitantly forming an annular rim 21 about the periphery. Preferably, dimension C provides for a reentrant recess over about 85 to 97% of the internal diameter of peripheral wall 12. After punching openings 22 and 24 through walls 12 and 18, respectively, the case is in a completed condition with wall 18 defining a rear compartment 27 and a front compartment 34. The case is now ready to receive the operating mechanism and rear closure as will be described with respect to FIG. 3.

As illustrated in FIG. 3, case 10 houses a gauge mechanism 25 that includes a Bourdon tube 26 in the rear compartment 27 for connection to a socket 28 through which pressure to be measured is introduced as represented by arrow 29. In response to changing values of pressure 29, the Bourdon tube functions to drive a pointer 30 on a pointer shaft 32 opposite dial plate 38 in front compartment 34. Operating mechanism 25 may, for example, be of a type more completely disclosed in U.S. Pat. No. 4,237,738. A bushing 36 may optionally be provided secured in a press fit within center offset 37 of wall 18 for support of the pointer shaft 32 and dial plate 38 in alignment with aperture 24. For effecting a tight enclosure, aperture flange 32 is welded at 33 to socket 28.

An annular grooved gasket 40 supporting window 42 is frictionally inserted in a force fit into compartment 34 about rim 21 to effect the enclosure therefor. A suitable rear closure assembly 44 affording relief in the event of overpressure within compartment 27 is provided at the rear of case 10 and may, for example, be of a type disclosed in co-pending U.S. application Ser. No. 473,829, filed Mar. 9, 1983, and entitled "Temperature Compensator for Liquid Filled Pressure Gauge". As illustrated in FIG. 4, gasket 40 is further secured by a mechanical force afforded by metallic trim ring 46.

By the above description there is disclosed a novel solid front case construction for a pressure gauge having a front wall fabricated of sheet metal integral with the annular sidewall. Typical sheet metal constructions suitable for these purposes would be of thickness on the order of about ½-2 millimeters, and could comprise by way of example stainless steel, galvanized steel, brass, aluminum, etc. Being formed in this manner, case fabrication represents the height of simplicity for forming a solid front gauge case, and from which it can be appreciated that considerable cost savings are realized as compared to similar purpose constructions of the prior art.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure gauge including a pressure sensitive element operably responsive to changes in fluid pressure to which it is connected, an indicator mechanism displaced by operation of said element for providing an indication of pressure value of the connected fluid and a transparent crystal supported in a superposed protective relation to said indicator mechanism, a solid front gauge case for housing said element and said indicating mechanism comprising:
   (a) sheet metal construction of an annular outer wall;
   (b) a solid front wall of sheet metal construction integral with said annular outer wall and positioned internally of said outer wall between said element and said indicator mechanism in the diametral plane of said outer wall;
   (c) an annular flange defined in a joining relation between said annular outer wall and said solid front wall and extending peripherally about the front face of said outer wall for providing the case support for said crystal;
   (d) said annular outer wall having an axial extent terminating rearwardly of said element so as to define by its internal diameter a rear opening thereat in which to receive a closure element; and
   (e) a closure element for the rear of said annular outer wall affording relief of overpressure from within said case.

2. In a pressure gauge according to claim 1 in which said solid front case wall is of a diameter in the range of about 85-97 percent of the internal diameter of said annular case wall.

3. In a pressure gauge according to claim 2 in which said sheet metal of said case construction is of a composition selected from a group consisting of stainless steel, brass, aluminum or galvanized steel.

* * * * *